United States Patent
Weir

(10) Patent No.: US 8,496,893 B2
(45) Date of Patent: Jul. 30, 2013

(54) METHOD OF FORMING A DIELECTRIC POWDER USING A PRECIPITATED PRECURSOR POWDER

(75) Inventor: Richard D. Weir, Cedar Park, TX (US)

(73) Assignee: EEStor, Inc., Cedar Park, TX (US)

( * ) Notice: Subject to any disclaimer, the term of this patent is extended or adjusted under 35 U.S.C. 154(b) by 267 days.

(21) Appl. No.: 12/823,826

(22) Filed: Jun. 25, 2010

(65) Prior Publication Data

US 2010/0331169 A1  Dec. 30, 2010

Related U.S. Application Data

(60) Provisional application No. 61/220,473, filed on Jun. 25, 2009.

(51) Int. Cl.
*C01G 23/00* (2006.01)
(52) U.S. Cl.
USPC .......... 423/71; 423/598; 501/134; 501/135; 501/136; 501/137; 501/138; 501/139
(58) Field of Classification Search
USPC .......... 501/134–139; 423/71, 598; 422/198, 422/199, 202, 209; 110/348; 432/14, 17, 432/200, 201, 202
See application file for complete search history.

(56) References Cited

U.S. PATENT DOCUMENTS

| | | | |
|---|---|---|---|
| 3,705,858 A * | 12/1972 | Luckey et al. | 252/301.4 S |
| 4,671,618 A | 6/1987 | Wu et al. | |
| 4,834,952 A | 5/1989 | Rollat et al. | |
| 5,017,446 A | 5/1991 | Reichman et al. | |
| 5,045,170 A | 9/1991 | Bullock et al. | |
| 5,340,510 A | 8/1994 | Bowen | |
| 5,929,259 A | 7/1999 | Lockemeyer | |
| 6,159,267 A * | 12/2000 | Hampden-Smith et al. | 75/252 |
| 6,180,029 B1 * | 1/2001 | Hampden-Smith et al. | 252/301.4 R |

(Continued)

FOREIGN PATENT DOCUMENTS

| CA | 02598787 | 3/2008 |
|---|---|---|
| CA | 02598754 | 4/2008 |

(Continued)

OTHER PUBLICATIONS

F. Sears et al., "Capacitance- Properties of Dielectrics", University of Physics, Addison Wesley Publishing Company, Inc., Feb. 1984, pp. 516-533.

(Continued)

*Primary Examiner* — Steven Bos
(74) *Attorney, Agent, or Firm* — Abel Law Group, LLP

(57) ABSTRACT

A furnace assembly includes first and second sections. The first section includes first and seconds ends, a first joint disposed at the first end, a conical portion at a second end, a first filter disposed between the first and second ends, and a lumen extending through the first section in fluid communication with the first filter. The second section includes first and second ends, a second joint disposed at the first end, an opening disposed at the second end and to receive the conical portion of the first section, a second filter disposed between the first and second ends, and a lumen extending through the second section in fluid communication with the second filter. When engaged, the first and second sections form a chamber between the first and second filters. The chamber is in fluid communication with the respective first ends of the first and second sections.

17 Claims, 5 Drawing Sheets

U.S. PATENT DOCUMENTS

| | | | |
|---|---|---|---|
| 7,068,898 | B2 | 6/2006 | Buretea et al. |
| 7,237,634 | B2 | 7/2007 | Severinsky et al. |
| 2001/0010367 | A1 | 8/2001 | Burnell-Jones |
| 2002/0020483 | A1 | 2/2002 | Wada et al. |

FOREIGN PATENT DOCUMENTS

| | | | |
|---|---|---|---|
| JP | 55154321 | | 12/1980 |
| JP | 61186223 | A | 8/1986 |
| JP | 07084349 | B2 | 9/1995 |
| JP | 11147716 | | 6/1999 |
| JP | 2003192343 | | 7/2003 |
| JP | 2006206363 | | 2/2008 |
| KR | 1019980028494 | | 7/1998 |
| KR | 101999-0070112 | | 9/1999 |
| WO | 9316012 | | 8/1993 |
| WO | 2008031189 | A1 | 3/2008 |
| WO | 2008040114 | A1 | 4/2008 |

OTHER PUBLICATIONS

J. Kuwata et al., "Electrical Properties of Perovskite-Type Oxide Thin-Films Prepared by RF Sputtering", Jpn J. Appl. Phys., Part 1, 1985, 413-15.

Bruno et al., "High-Performance Multilayer Capacitor Dielectrics from Chemically Prepared Powders", Journal of the American Ceramic Society, vol. 76, No. 5, pp. 1233-1241, 1993.

Mitsubishi Polyester Film Corporation specification sheet for Hostaphan (R) RE film for capacitors, Copyright 2007.

Beheir et al., "Studies on the liquid-liquid extraction and ion and precipitate flotation of Co(II) with decanoic acid", Journal of Radioanalytical and Nuclear Chemistry, Articles, vol. 174m, No. 1 (1992) 13-22.

International Search Report and Written Opinion dated Feb. 14, 2011 for family member PCT/US/2010/040020.

* cited by examiner

METHOD OF FORMING A DIELECTRIC POWDER USING A PRECIPITATED PRECURSOR POWDER

CROSS-REFERENCE TO RELATED APPLICATION(S)

The present application claims priority from U.S. Provisional Patent Application No. 61/220,473, filed Jun. 25, 2009, entitled "FUSED QUARTZ HORIZONTAL FURNACE AND ASSEMBLY," naming inventor Richard D. Weir, which application is incorporated by reference herein in its entirety.

FIELD OF THE DISCLOSURE

This disclosure relates to fused quartz horizontal furnaces and methods for use of same, particularly for the formation of dielectric particulate.

BACKGROUND

In the conventional preparation of wet-chemical co-precipitated mixed-oxide ceramic powders, the wet-co-precipitated powders are separated from the aqueous solution, in which they are formed, by filtration, sedimentation, centrifugation, or evaporation, washed with DI water, separated again, washed with acetone or 2-propanol, separated again, spread in a silica glass flat-bottom tray or in a silica glass round-bottom boat, and dried in an oven or vacuum oven at 105° C. or so. After drying, the tray is transferred to a box furnace, or the boat to a tube furnace. In the furnace, the temperature is increased to the calcining temperature.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
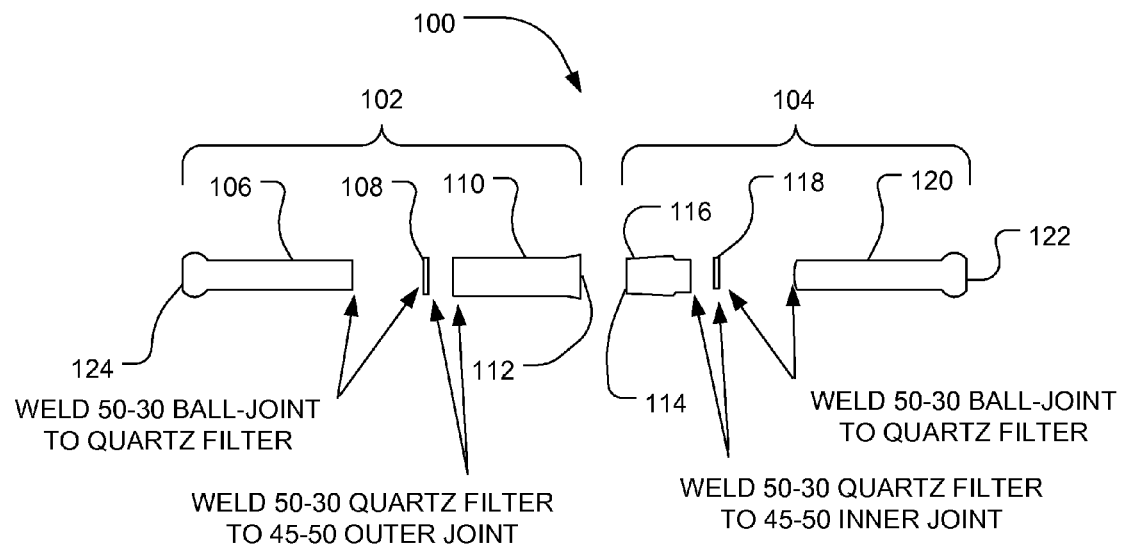
FIG. 1 includes an illustration of an exemplary tube assembly of a decomposition and calcining system.

In particular, Applicants discovered that the product powders resulting from prior art sequences of steps, as described above, are agglomerates and have been exposed to gradient temperatures in the powders during the temperature processing profile. Such gradient temperatures in the powders can cause significant reductions in relative permittivity due to improper decomposition temperatures, improper air flow during decomposition and calcining, and variances in the calcining temperatures. Further, Applicants discovered that the assembly and system described below and the method of decomposition and calcination described below can provide powders with separated particles (unagglomerated), and can provide a one-process station for dry powder processing, reducing the complexity of the process.

For example, the constituent ingredients can be mixed and precipitated to form intermediate particles that are further treated and calcined to form the dielectric ceramic particulate. As described in more detail below, the constituent ingredients can be blended in a high turbulence reactor with a blend of a source of hydroxide ions and a source of oxalate ions. For example, the source of hydroxide ions can include tetraalkylammonium hydroxide and the source of oxalate ions can include tetraalkylammonium oxalate. Particles that form as a result of the precipitation in the presence of hydroxyl and oxalate ions are further hydrothermal treated, dried and calcined under specific conditions to provide a dielectric ceramic particulate having desirable properties, such as breakdown voltage and relative permittivity. In particular, the dielectric ceramic particulate can be cubic perovskite composition-modified barium titanate.

An exemplary process includes providing precursor chelates in a combined solution with other metal or oxometal ion constituents of a ceramic powder, preparing a precipitant solution including tetraalkylammonium hydroxide and an oxalate compound, such as ammonium oxalate or tetraalkylammonium oxalate, combining the combined solution and the precipitant solution to coprecipitate particles, hydrothermally treating the particles, washing and separating the particles, and heat treating the particles to undergo decomposition and calcining.

In an exemplary embodiment, a system for forming a dielectric particulate includes a reactor and a hydrothermal treatment chamber. In addition, the system can include a dryer, followed by decomposition and calcining equipment.

Reactant storage vessels can include one or more reactants, for example, in the form of reactant solutions. In particular, the reactants can include a metal nitrate, a metal chelate, tetraalkylammonium hydroxide or tetraalkylammonium oxalate, or any combination thereof. The metal nitrate or metal chelate can include a metal ion or oxometal ion including a metal or semi-metal of Groups 1-14 of the periodic table, the lanthanoid series, or the actinoid series, based on the IUPAC convention. For example, the metal ions can be selected from the group including barium, calcium, titanium, zirconium, yttrium, manganese, neodymium, tin, zinc, vanadium, niobium, tantalum, molybdenum, tungsten, lanthanum, hafnium, chromium, or any combination thereof. In particular, the metal ions include barium, titanium, and at least one of calcium, zirconium, yttrium, manganese, neodymium, tin, zinc, vanadium, niobium, tantalum, molybdenum, tungsten, lanthanum, hafnium, chromium, or any combination thereof. An exemplary metal nitrate includes barium nitrate, calcium nitrate, or a combination thereof. An exemplary metal chelate includes a metal ion or oxometal ion and a chelating agent. In an example, the chelating agent includes a carboxylic acid neutralized with a base. For example, the chelating agent can include a neutralized alpha-hydroxycarboxylic acid. An exemplary alpha-hydroxycarboxylic acid includes 2-hydroxyethanoic acid (glycolic acid), 2-hydroxybutanedioic acid (malic acid), 2,3-dihydroxybutanedioic acid (tartaric acid), 2-hydroxy-1,2,3-propanetricarboxylic acid (citric acid), 2-hydroxybutanoic acid, 2-hydroxypentanoic acid, 2-hydroxyhexanoic acid, or any combination thereof. A preferred chelating agent is the very water-soluble 2-hydroxypropanoic acid (i.e., lactic acid) followed by neutralization with the weak-base ammonium hydroxide aqueous solution. Another preferred chelating agent is the very water-soluble 2-hydroxy-1,2,3-propanetricarboxylic acid, i.e. citric acid. The chelating agent can be neutralized with a base, such as ammonium hydroxide ($NH_4OH$) or tetraalkylammonium hydroxide. The chelated solution can also include a surfactant.

Further, the reactants can include a tetraalkylammonium hydroxide, tetraalkylammonium oxalate or combinations thereof in which the alkyl group includes methyl, ethyl, or propyl groups, or any combination thereof. In particular, the reactants can include a combination of tetramethylammonium hydroxide and tetramethylammonium oxalate.

In one embodiment, at least one, but not all of the precursors are chelates. A solution of the precursors: $Ba(NO_3)_2$, $Ca(NO_3)_2.4H_2O$, $Nd(NO_3)_3.6H_2O$, $Y(NO_3)_3.4H_2O$, $Mn(CH_3COO)_2.4H_2O$, $ZrO(NO_3)_2$, is formed in deionized water, and separately the $[CH_3CH(O-)COONH_4]_2Ti(OH)_2$, solution. In this example, the titanium chelate $[CH_3CH(O-)COONH_4]_2Ti(OH)_2$ can be used. The solution can be mixed or heated (e.g., heated to 95°-99° C.). For a particular composition shown by the atom fraction, the proportionate amount in weight percent for each of the metal-ion constituents is shown in Table 1.

TABLE 1

Exemplary Formulation

| Metal Element | Atom Fract. | Atomic Wt. | Product | Wt % |
|---|---|---|---|---|
| Ba | 0.9575 | 137.327 | 131.49 | 98.53 |
| Ca | 0.0400 | 40.078 | 1.60 | 1.20 |
| Nd | 0.0025 | 144.240 | 0.36 | 0.27 |
| Total | 1.0000 | | | 100.00 |
| Ti | 0.8150 | 47.867 | 39.01 | 69.92 |
| Zr | 0.1800 | 91.224 | 16.42 | 29.43 |
| Mn | 0.0025 | 54.930 | 0.14 | 0.25 |
| Y | 0.0025 | 88.905 | 0.22 | 0.39 |
| Total | 1.0000 | | | 100.00 |

The metal-ion constituents that can be used for the co-precipitation of the composition-modified barium titanate powders used in, for example, the seven and nine constituent runs are identified in the following list: barium, calcium, titanium, zirconium, yttrium, manganese, neodymium, tin, zinc, vanadium, niobium, tantalum, molybdenum, tungsten, lanthanum, hafnium, and chromium, or any combination thereof.

Table 2 illustrates an example composition-modified barium titanate compound formed using the above-described chelate precursors. In this example, the formula weight of the resulting compound is 237.24.

TABLE 2

Precursor Composition

| Precursor | FW | Mol. Fract. | Product | Wt % |
|---|---|---|---|---|
| $Ba(NO_3)_2$ | 261.43 | 0.4787 | 125.11 | 44.45 |
| $Ca(NO_3)_2 \cdot 4H_2O$ | 236.15 | 0.0200 | 4.732 | 1.67 |
| $Nd[CH_3CH(O-)COONH_4]_3$ | 465.57 | 0.00125 | 0.5819 | 0.207 |
| $[CH_3CH(O-)COONH_4]_2Ti(OH)_2$ | 294.08 | 0.4075 | 119.83 | 42.58 |
| $[CH_3CH(O-)COONH_4]_2Zr(OH)_2$ | 337.44 | 0.0900 | 30.37 | 10.79 |
| $Mn[CH_3CH(O-)COONH_4]_2$ | 269.15 | 0.00125 | 0.3364 | 0.119 |
| $Y[CH_3CH(O-)COONH_4]_3$ | 410.23 | 0.00125 | 0.5128 | 0.182 |
| Total | | | 281.48 | 100.00 |

A separate solution of ammonium oxalate or tetramethylammonium oxalate and tetramethylammonium hydroxide somewhat in excess of the stoichiometic amounts, is made in deionized water and heated to 95° to 99° C. with the pH in the 8.0 to 12.0 range, preferable about 10.5.

Various wet-chemical powder preparation techniques for composition-modified barium titanate are described below. The methods make use of aqueous solutions for the reactants to form the desired powders by co-precipitation. Furthermore, the approach extends the use of one or more chelates (preferably water-soluble or water stable) as precursors to several of the component metal ions comprising the constituents of the composition-modified barium titanate. In an example, ammonium oxalate (also known as diammonium ethanedioate) or tetraalkylammonium oxalate, such as tetramethylammonium oxalate (also known as bis(tetramethylammonium) ethanedioate), in combination with tetraalkylammonium hydroxide, such as tetramethylammonium hydroxide, are used as the precipitant solution for the mixture of precursors in aqueous solution.

The volume amount of the precipitant solution can be determined from the molar concentration of the precursor solution, when the specific gravity at 20° C. in addition to the molal concentration is known. Since the oxalate anion is doubly negatively charged and the hydroxide anion (e.g., a tetraalkylammonium hydroxide) is singly negatively charged, as precipitants for a given molar concentration, half as many oxalate anions compared to hydroxide anions can be used for the precipitation reaction with the metal-ion cations. The ammonium oxalate or tetraalkylammonium oxalate in aqueous solution is at neutral or near neutral pH (e.g., 6-8 pH), but here the solution is made sufficiently basic with the addition of tetramethylammonium hydroxide to result in a pH in the range of 8.0 to 12.0 pH of the mixed solutions, upon reaction with the neutral or near-neutral pH precursor solution.

In particular, the precipitant solution includes an oxalate source, such as ammonium oxalate or tetraalkylammonium oxalate, and a hydroxide, such as tetraalkylammonium hydroxide. For example, the solution can include the oxalate source in a mole ratio relative to the hydroxide in a range of 4:1 to 1:2, such as a range of 3:1 to 2:3, a range of 2:1 to 4:5, or a range of 2:1 to 1:1. The ratio of a 25% solution of tetramethylammonium hydroxide to a 25% solution of tetramethylammonium oxalate can be respectively 148 grams for every 1000 grams. A suitable temperature range for the formation of aqueous-solution of hydrated oxalate-hydroxide precipitated powders is 95° C. to 99° C.

In an example, oxalate compounds can include ammonium oxalate or tetraalkylammonium oxalate. An exemplary tetraalkylammonium oxalate includes tetramethylammonium oxalate (TMAO), tetraethylammonium oxalate, tetrapropylammonium oxalate, tetrabutylammonium oxalate, or any combination thereof. Ammonium oxalate monohydrate is typically made by the reaction of oxalic acid and ammonium hydroxide in aqueous solution. At pH 7, there is generally no unreacted oxalic acid and ammonium hydroxide. While the ammonium oxalate is typically used at pH 7, it is often provided by manufacturers in the pH 6.0 to 7.0 range. Tetramethylammonium oxalate is currently available and is similarly prepared.

For the case of tetramethylammonium hydroxide [$(CH_3)_4NOH$], the concentration is typically 25 weight percent in an aqueous solution with a specific gravity at 20° C. of 1.016, corresponding to 3.6570 molal and 2.7865 molar concentrations. At 80° C., the solubility of ammonium oxalate is 1.8051 molal, and since half as many oxalate anions compared to hydroxide anions are used for the precipitation reaction with the metal-ion cations, the solution volumes are essentially equivalent. For the case of tetramethylammonium oxalate the same molal concentration can be selected.

When ammonium oxalate or tetramethylammonium oxalate is present in stoichiometric quantity with 2 to 5 percent excess, even with the addition of tetramethylammonium hydroxide to increase the pH sufficiently to result in a pH in the range of 8.0 to 12.0 at the time of reaction of the precursor and precipitant solutions, and at preferably 95° C. to 99° C., partial-crystalline hydrated oxalate-hydroxides are formed instead of gelatinous hydrous hydroxides and/or oxides. Interestingly, the 2-hydroxycarboxylic acids and the oxalate anion are bidendate with two oxygen bonding sites within the ligand to the central metal or oxometal ion, and also are both five-sided rings.

The pH of the ammonium oxalate or tetramethylammonium oxalate solution is raised from about 7 to a sufficiently high value so that upon mixing of the two reactant streams the pH is in the range of 8 to 12 upon mixing, preferably about 10.6, where the precipitation occurs to completion at preferably 95° C. to 99° C. for the metal and oxometal ion constituents in the solution. The pH is adjusted by the addition of a strong base selected from among the tetraalkylammonium hydroxides, such as tetramethylammonium hydroxide [$(CH_3)_4NOH$], to the point in the pH range of 8 to 12, preferably about 10.6, where precipitation at 95° C. to 99° C. occurs to completion of the metal and oxometal ion constituents.

In the preparation of the metal-ion and oxometal-ion precursor solutions where both 2-hydroxypropanoic acid (lactic acid) [$CH_3CH(OH)COOH$] and 2-hydroxy-1,2,3-propanetricarboxylic acid (citric acid) [$(OH)C(COOH)(CH_2COOH)_2$] have been used as the chelating agent, the latter can be preferable because of higher solubilities in water, as concentration in moles per liter of solution at 20° C., i.e., molar, and moles per 1000 grams of water, i.e., molal, are obtained.

The reactor is configured to provide a turbulence intensity of at least $1.5 \times 10^7$ cm/s$^3$ at operating conditions. Turbulence intensity is defined as the product of a dimensionless constant (k) characteristic of the mixing device (approximately 1.0 for the present reactor) and the cube of the velocity of the combined fluid streams in the mixer, divided by the square of the inside diameter of the mixer. In an example, the operating conditions include a reaction tube velocity of at least 500 cm/s, such as at least 1000 cm/s, at least 1500 cm/s, or even at least 2000 cm/s. In a particular example, the reaction tube velocity is not greater than 20,000 cm/s, such as not greater than 15,000 cm/s, or even not greater than 10,000 cm/s. For example, the reactor can include a reaction tube having a closed end and an open end. The injection ports can be disposed proximal to the closed end. Further, the ports are coaxial with and directly opposite one another. Once mixed, the reactants flow through the reactor from the closed end towards the open end for a period of at least 50 milliseconds and are directed to a hydrothermal treatment chamber.

As stated above, the reactor is configured to perform the reaction at a turbulence intensity of at least $1.5 \times 10^7$ cm/s$^3$. In a particular embodiment, such high turbulence intensity is achieved using a tubular reactor with coaxial and directly opposite injection. In an embodiment, the reactor is configured to provide a high turbulence intensity, defined as the product of a dimensionless constant (k) characteristic of the mixing device (approximately 1.0 for the present reactor) and the cube of the velocity of the combined fluid streams in the mixer, divided by the square of the inside diameter of the mixer. For example, the turbulence intensity can be at least $1.5 \times 10^7$ cm/s$^3$, such as at least $10^8$ cm/s$^3$, at least $10^9$ cm/s$^3$, at least $10^{10}$ cm/s$^3$, or even at least $5 \times 10^{10}$ cm/s$^3$. In general, the turbulence intensity is not greater than $10^{20}$ cm/s$^3$. In addition, the tubular reactor can provide an average Reynold's number of at least 20,000. For example, the Reynold's number can be at least 40,000, such as at least 60,000, at least 70,000, or even at least 75,000. In an example, the Reynolds number is not greater than 200,000.

The reactor can be configured for a residence time of at least 50 milliseconds, such as at least 70 milliseconds, or even at least 80 milliseconds. In an example, the reactor is configured for a residence time of not greater than 1 second.

In a particular embodiment, a method for forming dielectric particulate includes injecting reactant solutions into a tubular reactor. One of the reactant solutions can include metal ions in the form of nitrates or chelates. In particular, metal nitrates can include barium nitrate. In addition, the metal nitrates can include calcium nitrate. Further, the reactant solution can include a metal chelate including a metal or oxometal ion including titanium and at least one of zirconium, yttrium, manganese, neodymium, tin, zinc, vanadium, niobium, tantalum, molybdenum, tungsten, lanthanum, hafnium, chromium, or any combination thereof. In an example, the metal chelate is a stabilized metal chelate including an alpha-hydroxycarboxylic acid, such as citric acid, stabilized with ammonium hydroxide or tetraalkylammonium hydroxide.

A second reactant solution can include tetraalkylammonium hydroxide, tetraalkylammonium oxalate, or a combination thereof. In a particular example, the second reactive solution includes a mixture of tetraalkylammonium hydroxide and tetraalkylammonium oxalate. The alkyl group of the tetraalkylammonium hydroxide or tetraalkylammonium oxalate can be a methyl, ethyl, or propyl group, or any combination thereof.

The reactant solutions are injected into the tubular reactor to provide both a desirable turbulence factor and other reaction conditions. In particular, the turbulence factor is at least $1.5 \times 10^7$ cm/s$^3$. The pH of the reaction can be in a range of 8 to 12, such as a range of 10 to 12. The temperature of the reactor can be in a range of 75° C. to 120° C., such as a range of 80° C. to 110° C., a range of 90° C. to 105° C., or even a range of 90° C. to 100° C. The pressure of the streams can be in the range of 90 psi to 120 psi or higher depending on the application. The residence time within the reactor can be at least 50 milliseconds.

In the tubular reactor, barium nitrate, titanium chelate, and other nitrate and chelate constituents coprecipitate to form a compositionally homogeneous particulate. Each particle within the compositionally homogeneous particulate has approximately the same composition, in contrast to a mixture of particles of different composition.

In one embodiment, the two ingredient streams, one containing the aqueous solution of all the metal-ion compound precursors and the other containing the aqueous solution of the ammonium oxalate or tetramethylammonium oxalate and tetramethylammonium hydroxide are reacted together simultaneously and continuously in a fluid jet column that provides a high turbulence energy environment. The total volume for the saturated or near-saturated aqueous solutions of the precursors is typically larger than that of the ammonium oxalate or tetramethylammonium oxalate and tetramethylammonium hydroxide in aqueous solution. There are generally two options in this case for the jet fluid column: (1) adjust the former to a flow rate proportionally larger than that of the latter, keeping the stream velocities equal by having the applied driving pressure to the two streams the same, but with the cross-sectional area of the nozzle of the former proportionally larger than that of the latter; and (2) dilute one volume of the latter by a proportional volume of DI water, thereby lowering the concentration of the precipitant. With equal volumes for both streams, the nozzles are alike, the flow rates are approximately equal, and the applied driving pressure is approximately the same. The amount of liquid processed is generally greater than that of the first option, however. The first option has the substantial advantage of reducing the amount of liquid handling and the usage of DI water.

In other embodiments, other techniques and devices can be used to combine the ingredient streams such as, for example: (1) pouring one solution in one vessel into the other solution in another vessel and using mechanical or ultrasonic mixing, and (2) metering the solution in one vessel at some given flow rate into the other solution in another vessel and using mechanical or ultrasonic mixing.

In the hydrothermal treatment chamber, the reactor product streams are treated at a temperature of at least 150° C. and a pressure of least 100 psi for a period of at least 4 hours. For example, the temperature can be at least 175° C., such as at least 190° C. if the associated pressure is also increased. Further, the pressure can be at least 225 psi, such as at least 245 psi, or even at least 250 psi or higher. The hydrothermal treatment is performed for a period of at least 4 hours, such as at least 5 hours, or even at least 6 hours. In an example, the hydrothermal treatment is performed at a temperature in a range of 150° C. to 200° C. and a pressure in a range of 225 psi to 260 psi for a period in a range of 4 hours to 8 hours. Higher temperature and pressure combinations can be utilized if desired. In a particular example, the top of the hydrothermal treatment vessel can be cooled to facilitate reflux.

The resulting slurry, following hydrothermal treatment, is transferred from the mixing vessel or hydrothermal tank to a filtration or separation device. Separating the precipitate from the liquid phase and isolating precipitate can be carried out using a variety of devices and techniques including: conventional filtering, vacuum filtering, centrifugal separation, sedimentation, spray drying, freeze drying, or the like. The filtered powder can then undergo various washing, drying, and decomposition and calcining steps.

The dielectric particulate material can be dried in a spray dryer, a pan dryer, a flash dryer, a cryogenic dryer, or any combination thereof. In a particular example, the dielectric particulate material is dried in a flash dryer. Prior to drying, the particulate material can be washed and partially separated. For example, the particulate material can be washed using deionized water and can be concentrated using a centrifuge. The washing and concentrating can be repeated one or more times.

Washing of the precipitated powder is optional because residual precipitant, the ammonium oxalate or tetramethylammonium oxalate and tetramethylammonium hydroxide residuals, and other residuals, are volatilized away. In some embodiments, a deionized (DI) water washing step, or some other washing step, is performed. Thus, by the nonmetal-ion-containing ammonium oxalate or tetramethylammonium oxalate and tetramethylammonium hydroxide an aqueous solution of water-soluble hydrated and chelated metal-ion species in their proportioned amounts is precipitated as a hydrated oxalate-hydroxide and by decomposition and calcination in air converted to the oxide (e.g., the composition-modified barium titanate).

Once dried, the particulate material can undergo decomposition and calcining in a furnace. For example, the particulate material can be heated at a temperature in a range of 25° C. to 1100° C. or higher. In particular, the material can be heated in an oxygenated and agitated environment to facilitate decomposition of organic byproducts and formation of a desired particulate material.

In wet-chemical methods for the preparation of ceramic powders by co-precipitation of a mixture of precursors from solution, small amounts of precipitant and water typically are included within the micropores and nanopores of the product powder. Similarly, small amounts of precipitant and water can also be adsorbed onto the surface of product powder. During calcination in air of the product powder, half of the oxygen of the oxalate anion in its thermal decomposition becomes part of a mixed oxide compound and the other half with the carbon is converted by oxidation to carbon dioxide gas, and solution residuals such as: ammonium oxalate [$(NH_4)_2C_2O_4$] (any excess amount) or tetramethylammonium oxalate $\{[(CH_3)_4N]_2C_2O_4\}$ (any excess amount), tetramethylammonium hydroxide [$(CH_3)_4NOH$] (any excess amount), ammonium nitrate ($NH_4NO_3$), ammonium 2-hydroxypropanate [$CH_3CH(OH)COONH_4$], and triammonium 2-hydroxy-1,2,3-propanetricarboxylate [$(OH)C(COONH_4)(CH_2COONH_4)_2$]. Such residuals are thermally decomposed and oxidized and thereby converted to gaseous products such as $H_2O$, $NH_3$, $CO$, $CO_2$, $N_2$, $N_2O$, $NO$, and $NO_2$. The decomposition of such residuals occurs over specified temperature ranges, rates of temperature increase, with acceptable clean dry air flow to assist in sweeping the gaseous products away at an acceptable rate. The same decomposition generally applies to any 2-hydroxycarboxylic acid that can be selected as a chelating agent, as described below.

The wet-chemical co-precipitated mixed oxalate-hydroxide ceramic powders, after drying and after disaglomeration, are transferred to a chamber for decomposition and calcination. As illustrated in FIG. 1, a tube assembly 100 includes a first section 102 and a second section 104. The first section 102 at end 112 and the second section 104 at end 114 cooperatively engage to form a chamber in which the ceramic powders can be placed. For example, the first section 102 at end 112 can include a wide tapered opening to receive a narrow conical region at end 114 of the second section 104.

Within each of the sections (102 and 104) can be shoulder retaining rings to secure to a small pore size filter disks (108 and 118). The pore size can be selected to ensure that the powder does not escape during the process. For example, the pore size can be not greater than 0.1 µm. In particular, the filters (108 and 118) are formed of materials that have thermal characteristics that match those of the material of the sections (102 and 104). For example, the sections (102 and 104) can be formed of silica glass (fused quartz) and the filters (108 and 118) can be formed of silica glass (fused quartz).

In a particular example, the assembly 100, in section 102, includes a connector portion 106 (e.g., a 50-30 ball-joint) and a first chamber portion 110 (e.g., a 45-50 outer joint) with the quartz filter 108 welded into the section 102, as illustrated in FIG. 1. The assembly 100, in section 104, includes a connector portion 120 (e.g., a 50-30 ball-joint) with the quartz filter 118 welded into the section 104, as illustrated in FIG. 1, and the connector/filter assembly is welded onto a second chamber portion 116 (e.g., a 45-50 inner joint). In a particular example, the connector portions 106 and 120 include ball-joints 124 and 122, respectively, which include an opening, providing access through the ball-joints 124 and 122 to the filters 108 and 118 and the chamber portions 110 and 116.

In an example, the second chamber portion 116 can couple to the first chamber portion 110 to form a chamber to receive powders to be calcined. As illustrated, the second chamber portion 116 includes a conical section that can friction fit with an opening of the first chamber portion 110. The second chamber portion 116 can be separated from the first chamber portion 110 and the section 102, which allows powder to be loaded into the first chamber portion 110. The sections 102 and 104 can be connected, and the assembly 100 can be placed into a horizontal furnace.

In an exemplary embodiment, the components of the assembly 100, as illustrated in FIG. 1, can, for example, include on the right side as illustrated:
1) a 50-30 Ball-joint with quartz 0.1 μm pore size filter welded into end assembly; and
2) a 45-50 Inner joint welded onto the ball joint assembly; and on the left side as illustrated:
1) a 50-30 ball joint assembly with quartz 0.1 μm pore size filter welded into the left side assembly; and
2) a 45-50 outer joint welded to the 50-30 ball joint assembly.

Figure 2:
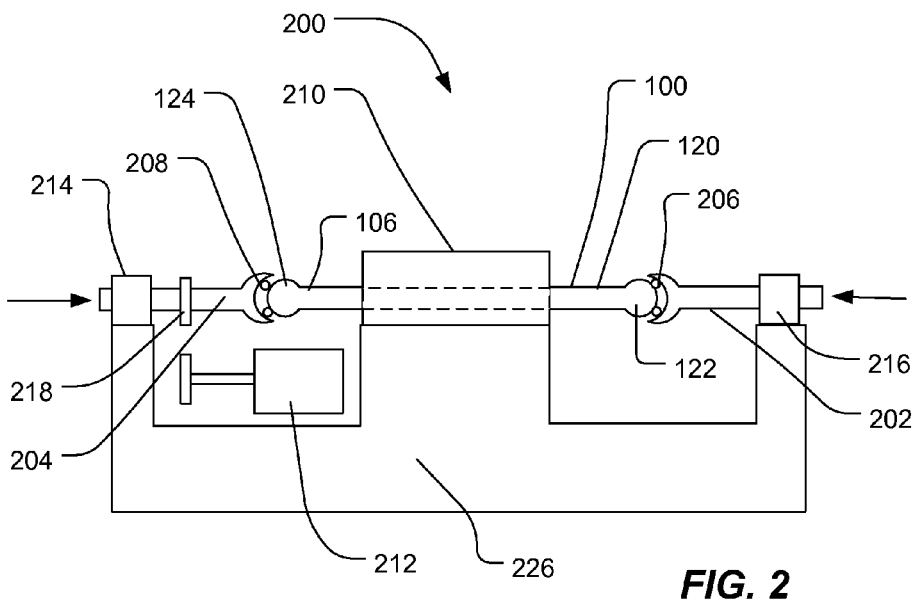
FIG. 2 includes an illustration of an exemplary decomposition and calcining system.

As illustrated in FIG. 2, the assembly 100 is held into a horizontal furnace 210 by two coupler joints 202 and 204, one at each end of the assembly 100. For example, the two coupler joints 202 and 204 can be formed of stainless steel. The two coupler joints 202 and 204 can be attached to a frame 226 of the furnace 210 and aligned so as to have the assembly 100 aligned through the center of the furnace assembly 200 when connected to the connector portions 106 and 120 at each end of the tube assembly 100. The coupler joints 202 and 204 can include o-rings 206 and 208 to assist in sealing the coupler joints 202 and 204 to the connector portions 106 and 120. In particular, the o-rings 206 and 208 can assist in sealing two different materials to each other, e.g., metal to quartz. In addition, clamps can be used to rigidly hold the connector portions 106 and 120 and the coupler joints 202 and 204 together during operation of the furnace 210. For example, the ball-joints 124 and 122 can be clamped to coupler joints 204 and 202 at ball-couplers, respectively. In a particular example, the coupler joints 202 and 204 are hollow tubes connected to hollow ball-couplers. At the outer ends of the coupler joints 202 and 204 are ferrofluidic bearing seals 214 and 216 that are attached to the tube furnace frame 226 and that can ensure alignment of the assembly 100 and retaining the coupler joints 202 and 204 to the furnace assembly 200.

In operation, clean dry air flows through the coupler joints 202 and 204 and the tube assembly 100. For example, the clean dry air can flow at a rate of at least 10 cubic feet per minute (CFM), such as at least 15 CFM. In another example, the clean dry air can flow at a rate of not greater than 50 CFM, such as not greater than 40 CFM, or even not greater than 30 CFM. In a particular example, the direction of flow of the clean dry air is alternated, for example, changing direction after at least 5 seconds, such as after at least 10 seconds. The clean dry air can change directions after a period not greater than 60 seconds, such as not greater than 50 seconds, or even not greater than 40 seconds.

A gear/motor drive assembly 212 and 218 is attached to the coupler joint 204 and rotates the assembly 100 at a specified rate during processing. In an example, the assembly 100 is rotated at a rate of at least 1 revolution per minute, such as at least 20 revolutions per minute, or even at least 40 revolutions per minute. The assembly 100 can be rotated at a rate of not greater than 120 revolutions per minute, such as not greater than 100 revolutions per minute, not greater than 80 revolutions per minute, or even not greater than 70 revolutions per minute. In a particular example, the assembly 100 is rotated at a rate between 40 revolutions per minute and 70 revolutions per minute, such as between 50 revolutions per minute and 70 revolutions per minute.

A controller (not illustrated) can provide for control of the processing parameters for the furnace assembly 200 after powders have been placed into the tube assembly 100 and the tube assembly 100 has been installed into the furnace assembly 200. For example, the quartz tube assembly is rotated at the specified rate, clean dry air flow is set to the specified rate, clean dry air (CDA) Flow Duration in alternating directions through the quartz assembly is set, and temperature profile is run at the specified temperature setting and key temperature durations.

During the alternating CDA flow, e.g., 15 to 30 CFM, durations the tube furnace temperature is increased in a manner that allows for successful decomposition and calcining followed by an acceptable decreases to room temperature. Different powder compositions can utilize different temperature increasing and decreasing profiles which can be controlled by changing settings of the tube furnace temperature controller.

In an example, calcining can be performed at a temperature in the range of 1000° C. to 1100° C., or higher. A exemplary temperature ramp cycle for composition-modified barium titanate powders has a sequence as follows:
Remove water from powder, e.g., ramp from 25° C. to 200° C. in 30 minutes;
Initiate $CO_2$ evolution, e.g., ramp from 200° C. to 600° C. in 180 minutes;
Control $CO_2$ evolution, e.g., ramp from 600° C. to 850° C. in 120 minutes (can be controlled, for example, with FTIR analysis of evolving gas);
Initiate calcining, e.g., ramp from 850° C. to 1050° C. in 60 minutes;
Calcine, e.g., dwell at 1050° C. for 180 minutes;
Cool down, e.g., ramp from 1050° C. to 300° C. in 60 minutes;
Introduce $O_2$, e.g., dwell at 300° C. for 120 minutes; and
Further cool down, e.g., ramp from 300° C. to 25° C. in 60 minutes.

The resulting dielectric ceramic particles have desirable properties. As a result of the process, a desirable dielectric particulate is provided. In particular, the dielectric particulate has a desirable particle size and particle size distribution. For example, the average (mean) particle size is at least 0.6 μm, such as at least 0.64 μm or even at least 0.7 μm, excluding particles of size less than 0.1 micrometers or greater than 10 micrometers. In an example, the average particle size is in a range of 0.6 to 2 μm, such as a range of 0.64 to 1.5 μm, a range of 0.7 μm to 1.5 μm a range of 0.9 to 1.5 μm, a range of 0.9 to 1.4 μm, or a range of 1.2 to 1.5 μm. Alternatively, the average particle size can be in a range of 0.6 μm to 1 μm, such as 0.6 μm to 0.9 μm, or even a range of 0.64 μm to 0.9 μm. In any case, the particle size distribution exhibits a half height ratio of not greater than 0.5. The half height ratio is defined as the ratio of the width of the particle size distribution at half of its maximum height and the average (mean) particle size for the distribution peak centered on the mean size. For example, the half height ratio can be not greater than 0.45, such as not greater than 0.4, not greater than 0.3, or even not greater than 0.2. Further, the standard deviation can be not greater than 2.0 micrometers, such as not greater than 1.5 micrometers, not greater than 1.3 micrometers, not greater than 1.2 micrometers, or even not greater than 1.15 micrometers.

In a particular embodiment, the dielectric ceramic particulate includes a cubic perovskite composition-modified barium titanate powder. The barium is at least partially substituted with calcium, neodymium, lanthanum, or a combination thereof, and the titanium is at least partially substituted with at least one of zirconium, yttrium, manganese, tin, zinc, vanadium, niobium, tantalum, molybdenum, tungsten, hafnium, chromium, or any combination thereof. The composition-modified barium titanate powder has an average particular size in a range of 0.6 to 1.5 micrometers, and a half width ratio of not greater than 0.5.

In particular, the ceramic powder is paramagnetic in a temperature range, such as temperature range of −40° C. to 85° C. or a temperature range of −25° C. to 55° C. Further, the ceramic powder is free of or has low concentrations of strontium or iron ions. In particular, the ceramic powder has a high-permittivity within the above temperature ranges, such as a relative permittivity (K) of at least 15000, such as at least 18000. In an example, the dielectric particulate exhibits a desirable relative permittivity, such as at least 15,000, at least 17,500, at least 18,000, or even at least 20,000. In an example, the relative permittivity can be at least 30,000, such as at least 35,000, at least 50,000, at least 65,000, or even at least 80,000 or higher. The breakdown voltage for the dielectric composite can be at least 1 MV/cm, such as at least 2 MV/cm, at least 4 MV/cm, or even at least 5 MV/cm.

EXAMPLES

Example 1

Two reactant streams are introduced into a tube reactor. The first stream includes barium nitrate, organic titanium chelate available under the Tradename Tyzor® from DuPont™, and trace amounts of other metal nitrates and metal or oxometal citrates, including seven metal constituents as indicated in Table 3 below being selected from calcium, zirconium, yttrium, manganese, neodymium, tin, zinc, vanadium, niobium, tantalum, molybdenum, tungsten, lanthanum, hafnium, or chromium. The second stream includes a mixture of tetramethylammonium hydroxide and tetramethylammonium oxalate. The first stream has a flow rate about four times greater than the flow rate of the second stream. The tube reactor has a turbulence intensity of approximately 8.3× $10^{10}$ cm/s$^3$ and a Reynolds number of approximately 78,000. The pH of the solution is maintained between 10 and 12 and the temperature is approximately 95° C. for both streams.

The particulate material formed in the reactor is hydrothermally treated using a pressure tank with a rating of 300 psi at 150° C. The tank top is chilled to condense water vapor, thereby ensuring the solution volume remains constant for the duration of the treatment. When the liquid stream including the particulate is delivered to the tank, the process parameters are set at 250 psi and 150° C. for 6 hours. Tetramethylammonium hydroxide is added to maintain the pH in a range of 10 to 12. Increasing the pressure and temperature can result in reduced hydrothermal processing duration.

Figure 3:
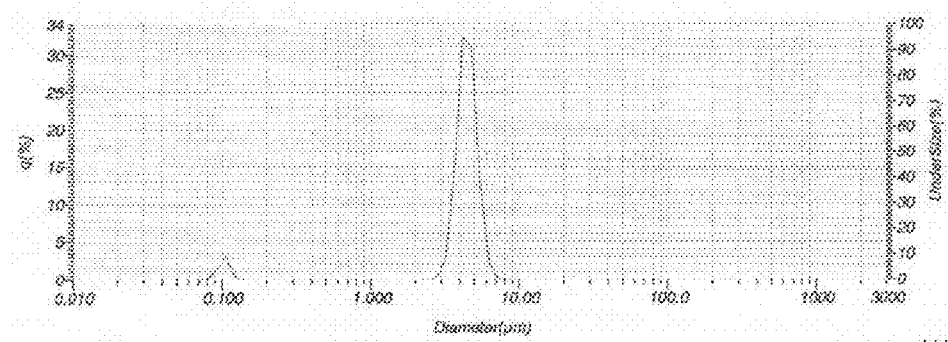
FIG. 3 and FIG. 4 include graphs of exemplary particle size and distributions data of the particles fabricated in Example 1 after the hydrothermal process and after the calcining process, respectively.
Figure 4:
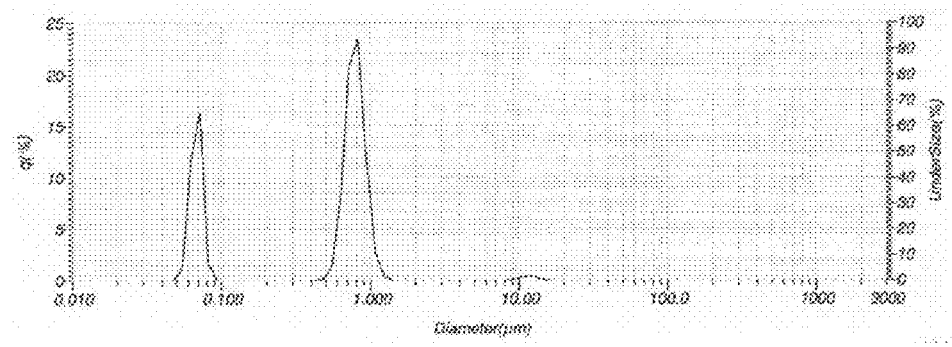
Figure 5:
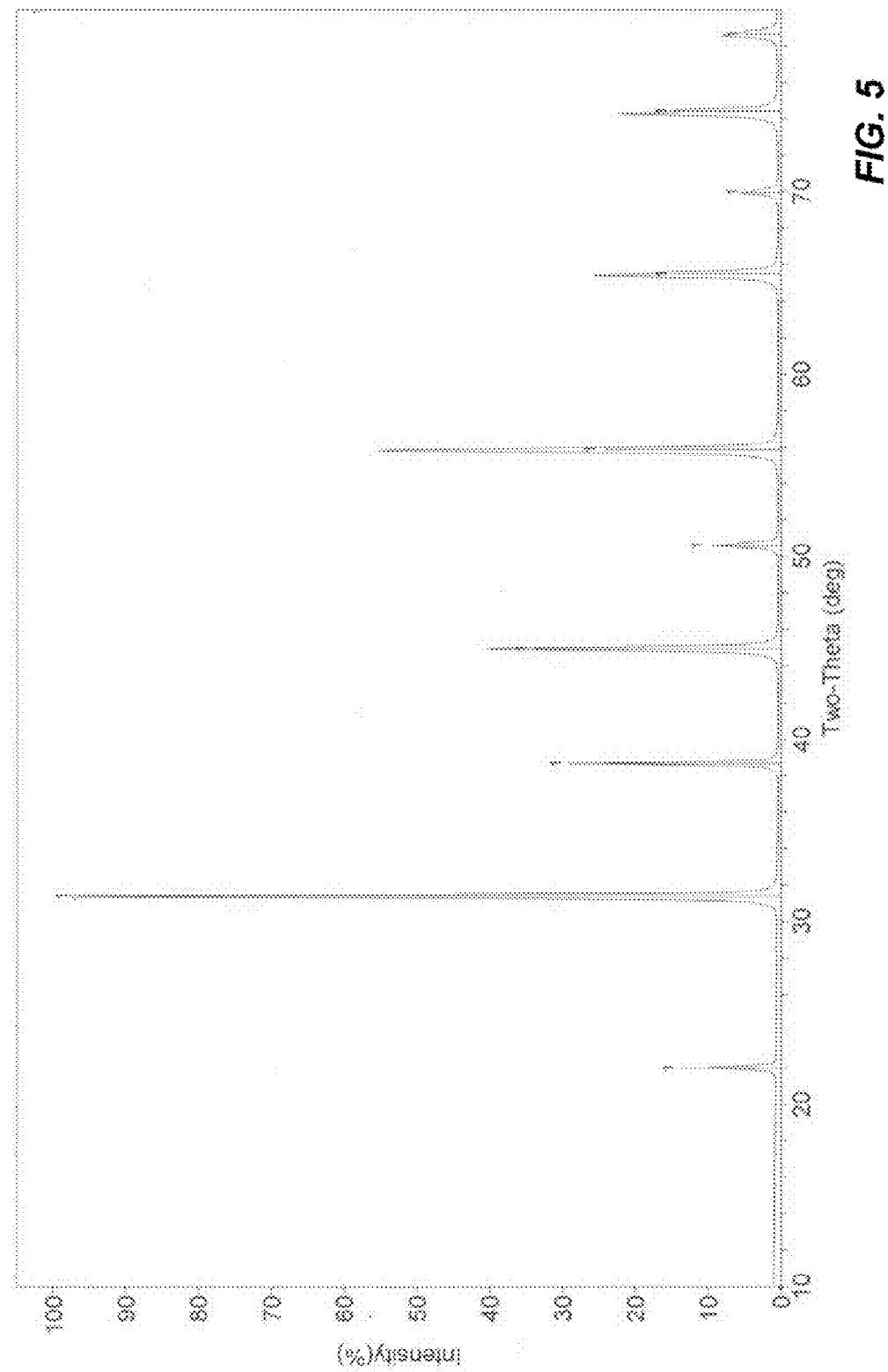
FIG. 5 includes a graph of exemplary x-ray diffraction data of the particles of Example 1.

Following hydrothermal treatment, the particles are washed, concentrated in a centrifuge, flash dried, and subjected to decomposition and calcining at temperatures in a range of 25° C. to 1050° C. or higher in the assemblies illustrated in FIG. 1 and FIG. 2 in accordance with the procedure described above. FIG. 3 illustrates the particle distribution following hydrothermal treatment. As illustrated, the mean particle size is approximately 4.24 µm and the standard deviation is approximately 1.16 µm. FIG. 4 illustrates the particle size distribution following decomposition and calcining The mean particle size is 0.67 µm and the standard deviation is 1.14 µm. FIG. 5 illustrates the nature of the crystal, indicating that the crystal is homogenous cubic perovskite crystal and can have a high-permittivity.

To determine percent yield, the composition of the aqueous starting precursors is verified. After the co-precipitation process is complete, the solid is removed and the remaining liquid is analyzed. The percentage of each constituent that has entered the composition modified barium titanate (CMBT) powder is determined. Analysis of the aqueous solutions is performed on a Perkin Elmer Optima 2100DV ICP-OES (induction-coupled-plasma optical-emission spectrograph). A calibration curve is generated for each analysis based on standards from High Purity Standards, Inc. At least eight standard solutions are used in calibration ranging from 0.0500 ppm to 10.0 ppm. The correlation coefficient of the calibration curves generated is greater than 0.999 for all constituents over the entire concentration range. Each calibration curve is manually inspected to ensure there are no erroneous points influencing the linear correlation. The analysis and dilutions are performed in triplicate. Initial concentrations of the seven constituents used in Example 1 are summarized in Table 3 and ranged from 30 to nearly 40,000 ppm. Analysis of the liquid after filtering out the CMBT powder shows constituent concentrations less than 10 ppm equating to nearly a 100% yield of each constituent in the CMBT powder.

TABLE 3

Liquid Analysis for Powder Preparation

| | Pre Process (ppm) | Pre Process (mg) | Post Process (ppm) | Post Process (mg) | Percent Yield (%) |
|---|---|---|---|---|---|
| Barium | 39133 | 290601 | 9.25 | 1690 | 99.42 |
| Tyzor ® | 11100 | 82428 | 0.107 | 2.24 | 100.00 |
| COMP #1 | 4200 | 31189 | 0.090 | 1.88 | 99.99 |
| COMP #2 | 56.06 | 416.3 | 0.091 | 1.90 | 99.54 |
| COMP #3 | 88.00 | 653.5 | <0.050 | 0.00 | 100.00 |
| COMP #4 | 30.00 | 222.8 | <0.050 | 0.00 | 100.00 |
| COMP #5 | 456.0 | 3386 | 0.386 | 8.07 | 99.76 |

Example 2

For Example 2, streams 1 and 2 are the same as in Example 1. The two reactant streams are introduced into a tube reactor. The first stream includes barium nitrate, organic titanium chelate available under the tradename Tyzor® from DuPont™, and trace amounts of other metal nitrates and metal or oxometal citrates, including metals selected from calcium, zirconium, yttrium, manganese, neodymium, tin, zinc, vanadium, niobium, tantalum, molybdenum, tungsten, lanthanum, hafnium, or chromium. The second stream includes a mixture of tetramethylammonium hydroxide and tetramethylammonium oxalate. The first stream has a flow rate about four times greater than the flow rate of the second stream. The tube reactor has a turbulence intensity of approximately $1.9 \times 10^7$ cm/s$^3$ and a Reynolds number of approximately 27,000.

The particulate material formed in the reactor is hydrothermally treated using a pressure tank with a rating of 300 psi at 150° C. The tank top is chilled to condense water vapor, thereby ensuring the solution volume remains constant for the duration of the treatment. When the liquid stream including the particulate is delivered to the tank, the process parameters are set at 250 psi and 150° C. for 6 hours. The pH is maintained in a range of 10 to 12. The resulting particulate is decomposed and calcined in accordance with the procedure described above.

Following hydrothermal treatment, the particles are washed, concentrated in a centrifuge, flash dried, and subjected to decomposition and calcining at temperatures in a range of 25° C. to 1050° C. or higher. Following decomposition and calcining, the mean particle size is approximately 1.38 μm and the half width ratio is less than 0.44. The relative permittivity (K) is in the range of 18,500 to 125,000 or higher over the temperature range of −20° C. to 55° C. or even a wider temperature range depending on the application.

Example 3

A process similar to the process of Example 2 is performed using nine constituent metal ions. The nine constituents in the starting aqueous mixture range in concentration from 50 to several thousand ppm. After the powder production process is complete, the constituents range from undetectable concentrations to a maximum of 8.44 ppm. The percent each of the constituent crystallized in the composition-modified barium titanate powder range from 99.52% to 100% as summarized in Table 4.

TABLE 4

Liquid Analysis for Powder Preparation

| | Pre Process (ppm) | Pre Process (mg) | Post Process (ppm) | Post Process (mg) | Percent Yield (%) |
|---|---|---|---|---|---|
| Barium | 41500 | 307888 | 8.44 | 1488 | 99.52 |
| Tyzor ® | 11780 | 87396 | 0.503 | 10.51 | 99.99 |
| COMP #1 | 4890 | 36278 | 0.604 | 12.62 | 99.97 |
| COMP #2 | 266.3 | 1976 | <0.050 | 0.00 | 100.00 |
| COMP #3 | 102.7 | 761.7 | <0.050 | 0.00 | 100.00 |
| COMP #4 | 589.3 | 4372 | <0.050 | 0.00 | 100.00 |
| COMP #5 | 77.60 | 575.7 | <0.050 | 0.00 | 100.00 |
| COMP #6 | 525.1 | 3895 | 0.388 | 8.11 | 99.79 |
| COMP #7 | 47.52 | 352.6 | <0.050 | 0.00 | 100.00 |

As described above, FIG. 3 and FIG. 4 indicate the effectiveness of the calcining system and process to reduce the particle size of the composition-modified barium titanate powder produced in Example 1 to the range of 0.6 μm to 0.8 μm. The particle size data is obtained by testing the composition-modified barium titanate powders on a Horiba laser scattering particle size distribution analyzer LA-950. FIG. 5 illustrates the data from an x-ray diffraction test of the powder produce in Example 1. Such data indicates a cubic perovskite crystalline structure with the activating chemical removed. The Quantitative X-Ray Diffraction data indicate a removal of the activating chemicals below the testing threshold of ppb level, which indicates the effectiveness of the decomposition and calcining process, the decomposition and calcining system, and the powder processing steps leading up to this phase of powder production. These steps are as follows:

Chelating chemicals allowing constituent multiple, up to nine, blending;

Activating chemical that allow effective precipitating of the constituents into composition-modified barium titanate powders;

High intensity blending of the activating chemicals and constituent chelating chemicals so the during the precipitating process the powder size is desirable;

A post powder hydrothermal high temperature/pressure activating process that assists in providing a 100% or near 100% compositionally homogeneous and size homogeneous powder; and Decomposition and calcining systems and process that assist in providing composition-modified barium titanate powder high purity, desired size, and desired crystalline structure.

Figure 6:
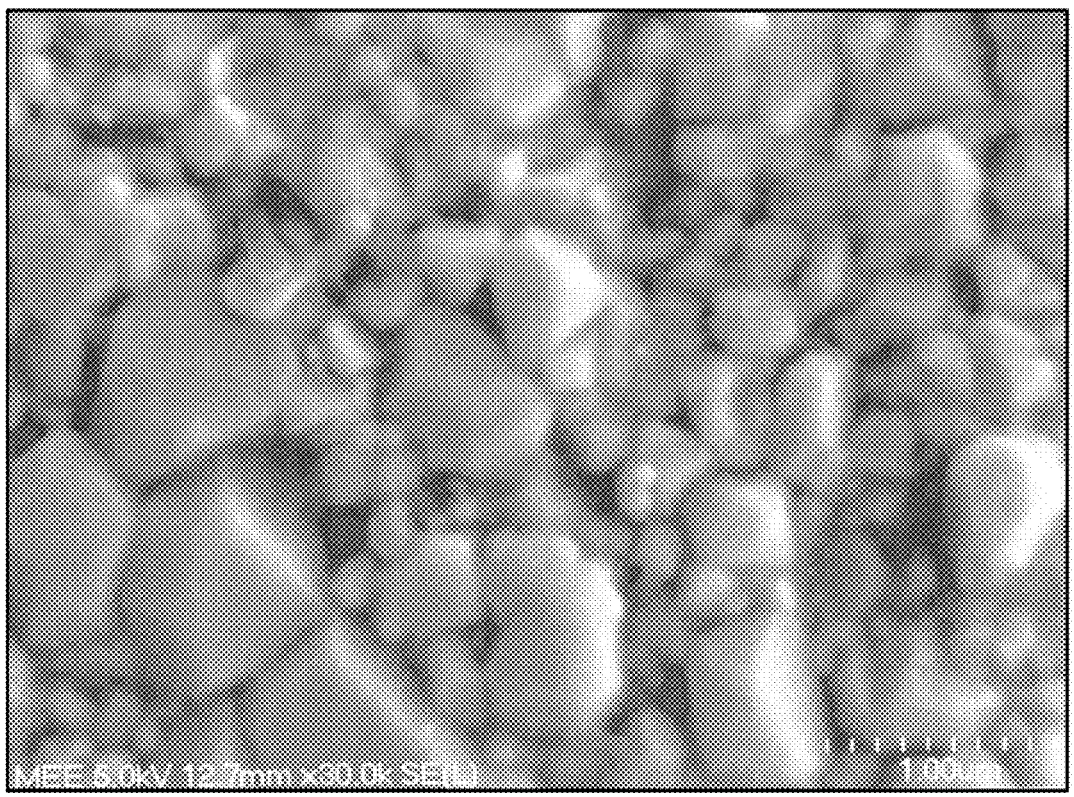
FIG. 6 includes an image of SEM data on the powders of Example 1.
Figure 7:
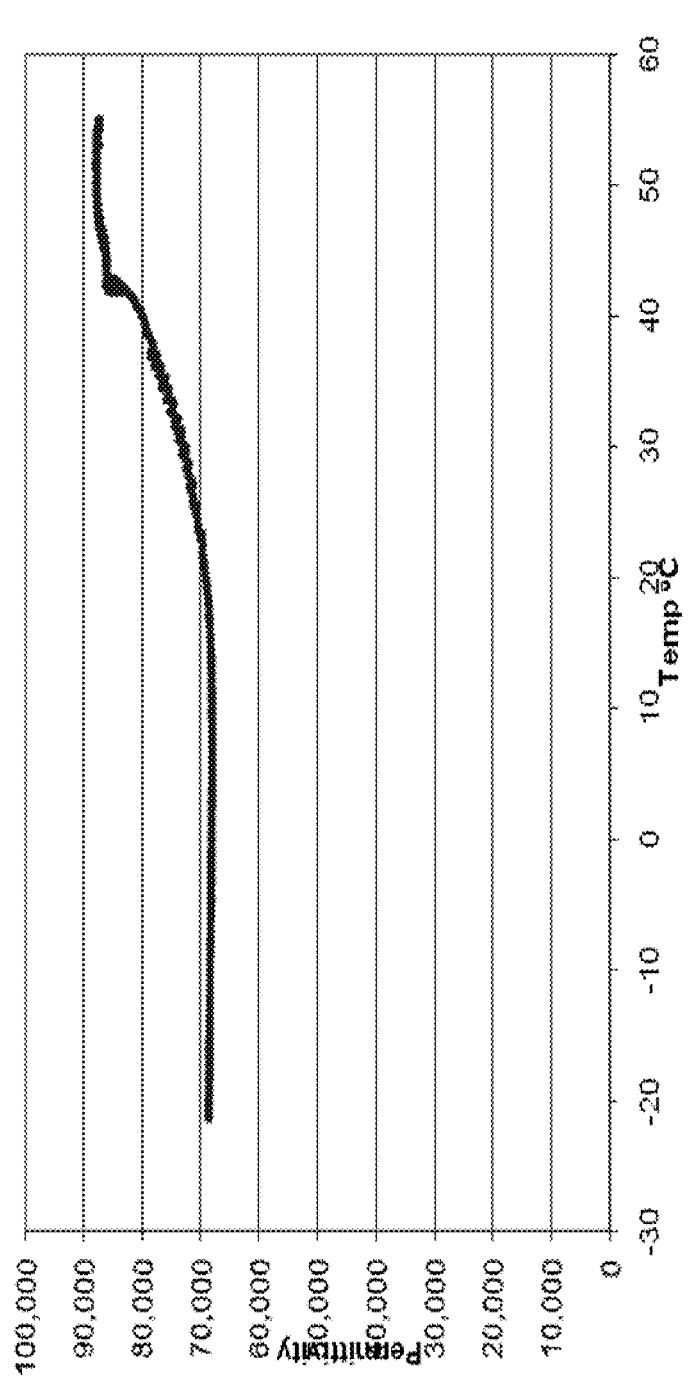
FIG. 7 includes a graph of relative permittivity vs. temperature over a temperature range of −20° C. to 55° C. for Example 2.

The following is additional data obtained from testing the powder of Example 1. FIG. 6 indicates the cubic shape of the powders and close packaging density that can be obtained due to the cubic shape. FIG. 7 illustrates test data on relative permittivity over the temperature range of −20° C. to 55° C. In particular, the relative permittivity is at least 35000, such as at least 50000, at least 65000, at temperatures in a range of −20° C. to 65° C., such as a range of 0° C. to 35° C. Further, the relative permittivity can be at least 70000, or even at least 75000, at temperatures such as at least 35° C. In addition, the deviation from the 25° C. ambient temperature provides an improvement over the ceramic capacitor testing standards. The X7R ceramic capacitor standard specification is +15% and −15% over their specified temperature range, where as the present powders have −2.1% negative deviation, representing a major improvement in ceramic capacitor technology. The test system to measure the relative permittivity over the indicated temperature ranges is an Agilent 4263B LCR meter and fixture, Cincinnati Sub-Zero Products, Inc., a Micro Climate Unit, IET Labs, Inc., a CS-301 capacitance substituter, and a Omegaette HH 314 Humidity and Temperature Meter.

In a first embodiment, a furnace assembly includes a first section including first and seconds ends, a first joint disposed at the first end, a conical portion at a second end, a first filter disposed between the first and second ends, and a lumen extending through the first section in fluid communication with the first filter. The furnace assembly further includes a second section including first and second ends, a second joint disposed at the first end, an opening disposed at the second end and to receive the conical portion of the first section, a second filter disposed between the first and second ends, and a lumen extending through the second section in fluid communication with the second filter. When engaged, the first and second sections form a chamber between the first and second filters. The chamber is in fluid communication with the respective first ends of the first and second sections.

In an example of the first embodiment, the first and second sections are formed of fused quartz. In another example, the first and second joints comprise ball joints.

In a second embodiment, a furnace assembly includes a furnace including a hollow section extending through the furnace and includes a chamber assembly. The chamber assembly includes a first section including first and seconds ends, a first joint disposed at the first end, a conical portion at a second end, a first filter disposed between the first and second ends, and a lumen extending through the first section in fluid communication with the first filter. In addition, the chamber assembly includes a second section including first and second ends, a second joint disposed at the first end, an opening disposed at the second end and to receive the conical portion of the first section, a second filter disposed between the first and second ends, and a lumen extending through the second section in fluid communication with the second filter. When engaged, the first and second sections form a chamber between the first and second filters. The chamber is in fluid communication with the respective first ends of the first and second sections.

In a third embodiment, a method of forming a dielectric powder includes placing a precipitated precursor powder into a chamber of a chamber assembly. The chamber assembly includes a first section including first and seconds ends, a first joint disposed at the first end, a conical portion at a second end, a first filter disposed between the first and second ends, and a lumen extending through the first section in fluid communication with the first filter. The chamber assembly also includes a second section including first and second ends, a second joint disposed at the first end, an opening disposed at the second end and to receive the conical portion of the first section, a second filter disposed between the first and second ends, and a lumen extending through the second section in fluid communication with the second filter. When engaged, the first and second sections form the chamber between the first and second filters. The chamber is in fluid communication with the respective first ends of the first and second sections. The method further includes heating the precipitated precursor powder to a calcining temperature.

In an example of the third embodiment, the method further includes rotating the chamber assembly while heating. Rotating can include rotating at a rate of at least 1 revolution per minute and not greater than 120 revolutions per minute.

In another example, the method further includes injecting air through the chamber. Injecting air can include injecting in alternating directions. For example, the direction of air injection can change at intervals of at least 10 seconds. In an example, the intervals are not greater than 60 seconds.

In a fourth embodiment, a method of forming dialect powders includes placing a coprecipitated precursor powder into a chamber having first and second ports, placing the chamber into a furnace, heating the precipitated precursor powder, and alternately injecting gas via the first and second ports.

In an example of fourth embodiment, alternately injecting air via the first and second ports includes injecting gas in the first port and receiving gas from of the second port for an interval and subsequently, injecting gas in the second port and receiving gas from the first port. For example, the interval is at least 5 seconds. In an example, the interval is not greater than 60 seconds.

In another example, the coprecipitated precursor includes an oxalate-hydroxide particulate. In a particular example, heating includes heating to a temperature in a range of 1000° C. to 1100° C.

In a fifth embodiment, a dielectric ceramic particulate includes compositionally-modified barium titanate having a cubic perovskite structure. The dielectric ceramic particulate has a relative permittivity at each temperature within a temperature range of −20° C. to 55° C. of at least 65,000. In an example of the fifth embodiment, the dielectric ceramic particulate has a breakdown voltage of at least 1 MV/cm.

In another example of the fifth embodiment, the composition-modified barium titanate includes barium at least partially substituted with calcium, neodymium, lanthanum, or a combination thereof, and titanium at least partially substituted with at least one of zirconium, yttrium, manganese, tin, zinc, vanadium, niobium, tantalum, molybdenum, tungsten, hafnium, chromium, or any combination thereof.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of forming a dielectric powder, the method comprising:
   placing a precipitated precursor powder into a chamber of a chamber assembly, the chamber assembly comprising:
      a first section including first and second ends, a first joint disposed at the first end, a conical portion at the second end, a first filter disposed between the first and second ends, and a lumen extending through the first section in fluid communication with the first filter; and
      a second section including first and second ends, a second joint disposed at the first end, an opening disposed at the second end to receive the conical portion of the first section, a second filter disposed between the first and second ends, and a lumen extending through the second section in fluid communication with the second filter;

when engaged, the first and second sections forming the chamber between the first and second filters, the chamber being in fluid communication with the respective first ends of the first and second sections; and heating the precipitated precursor powder to a calcining temperature.

2. The method of claim 1, further comprising rotating the chamber assembly while heating.

3. The method of claim 2, wherein rotating comprises rotating at a rate of at least 1 revolution per minute and not greater than 120 revolutions per minute.

4. The method of claim 1, further comprising injecting air through the chamber.

5. The method of claim 4, wherein injecting air includes injecting in alternating directions.

6. The method of claim 5, wherein the direction of air injection is changed at intervals of at least 10 seconds.

7. The method of claim 6, wherein the intervals are not greater than 60 seconds.

8. The method of claim 1, wherein the precipitated precursor powder is a precursor to a composition-modified barium titanate.

9. The method of claim 8, wherein heating to a calcining temperature includes heating to form the composition-modified barium titanate having a cubic perovskite structure.

10. The method of claim 1, wherein the precipitated precursor powder includes an oxalate-hydroxide particulate.

11. A method of forming a dielectric powder, the method comprising:

placing a coprecipitated precursor powder into a chamber having first and second ports;

placing the chamber into a furnace;

heating the precipitated precursor powder; and alternately injecting gas via the first and second ports.

12. A method of forming a dielectric powder, the method comprising:

placing a coprecipitated precursor powder into a chamber having first and second ports;

placing the chamber into a furnace;

heating the coprecipitated precursor powder; and alternately injecting gas via the first and second ports, wherein alternately injecting gas via the first and second ports includes injecting gas in the first port and receiving gas from the second port for an interval and subsequently, injecting gas in the second port and receiving gas from the first port.

13. The method of claim 12, wherein the interval is at least 5 seconds.

14. The method of claim 12, wherein the interval is not greater than 60 seconds.

15. The method of claim 12, wherein the coprecipitated precursor powder includes an oxalate-hydroxide particulate.

16. The method of claim 12, wherein heating includes heating to a temperature in a range of 1000° C. to 1100° C.

17. The method of claim 12, wherein the chamber comprises:

a first section including first and second ends, a first joint disposed at the first end, a conical portion at the second end, a first filter disposed between the first and second ends, and a lumen extending through the first section in fluid communication with the first filter; and a second section including first and second ends, a second joint disposed at the first end, an opening disposed at the second end to receive the conical portion of the first section, a second filter disposed between the first and second ends, and a lumen extending through the second section in fluid communication with the second filter;

when engaged, the first and second sections forming the chamber between the first and second filters, the chamber being in fluid communication with the respective first ends of the first and second sections.

\* \* \* \* \*